(12) United States Patent  
Pope

(10) Patent No.: US 6,481,340 B2
(45) Date of Patent: Nov. 19, 2002

(54) BREWER FILTER SUPPORT

(75) Inventor: Randy D. Pope, Edinburg, IL (US)

(73) Assignee: Bunn-O-Matic Corp., Springfield, IL (US)

( * ) Notice: Subject to any disclaimer, the term of this patent is extended or adjusted under 35 U.S.C. 154(b) by 0 days.

(21) Appl. No.: 09/835,224

(22) Filed: Apr. 12, 2001

(65) Prior Publication Data

US 2001/0013275 A1 Aug. 16, 2001

Related U.S. Application Data

(62) Division of application No. 09/395,245, filed on Sep. 13, 1999, now Pat. No. 6,250,209.

(51) Int. Cl.$^7$ .................... A47J 31/00; B01D 29/085
(52) U.S. Cl. ..................... 99/306; 99/295; 99/323
(58) Field of Search ..................... 99/306, 323, 304, 99/307, 295; 210/479, 477, 474

(56) References Cited

U.S. PATENT DOCUMENTS

| | | | |
|---|---|---|---|
| 3,034,418 A | 5/1962 | Bunn | 99/323 |
| 3,187,663 A | 6/1965 | McLean, Jr. et al. | 99/305 |
| 3,261,279 A | 7/1966 | Kaplan et al. | 99/282 |
| 3,374,897 A | 3/1968 | Martin | 210/455 |
| 3,388,804 A | 6/1968 | Hester | 210/470 |
| 3,593,650 A | 7/1971 | Martin et al. | 99/291 |
| 3,610,132 A | 10/1971 | Martin et al. | 99/295 |
| 4,303,525 A | 12/1981 | Stover | 210/455 |
| 4,765,896 A | 8/1988 | Hartley et al. | 210/474 |
| 5,064,533 A | 11/1991 | Anson | 210/232 |
| 5,113,752 A | 5/1992 | Brewer | 99/295 |

Primary Examiner—Reginald L. Alexander
(74) Attorney, Agent, or Firm—Barnes & Thornburg

(57) ABSTRACT

A beverage brewing filter structure used to retain a brewing filter and a quantity of beverage brewing substance. The brewing filter structure is designed to create a consistent bed depth and a plurality of wicking points in order to give a more even extraction of the beverage brewing substance and a better taste profile over other standard filter structures. The brewing filter structure is generally an integral filter and includes a base and a wall, which extends from the base to a top rim and defines a generally annular mouth and lip of the funnel. In the brewing filter structure, the wall operates as a sidewall of the brewing funnel and is generally continuous, without open spaces. The base of the brewing filter structure is formed from a plurality of flanges, which generally extend radially inwardly toward a center portion of the base, the tips of which terminate and create wicking points proximate to a drain aperture. The top portions of the flanges and wicking points are generally oriented in a common plane but may also define a surface which is at least partially upwardly conical. The bottoms of the flanges generally rest upon the bottom surface of the brewing funnel, which provides stability and support for the base, and thus follow the same angle that the bottom surface has from the wall, or sidewall, to the drain aperture.

7 Claims, 3 Drawing Sheets

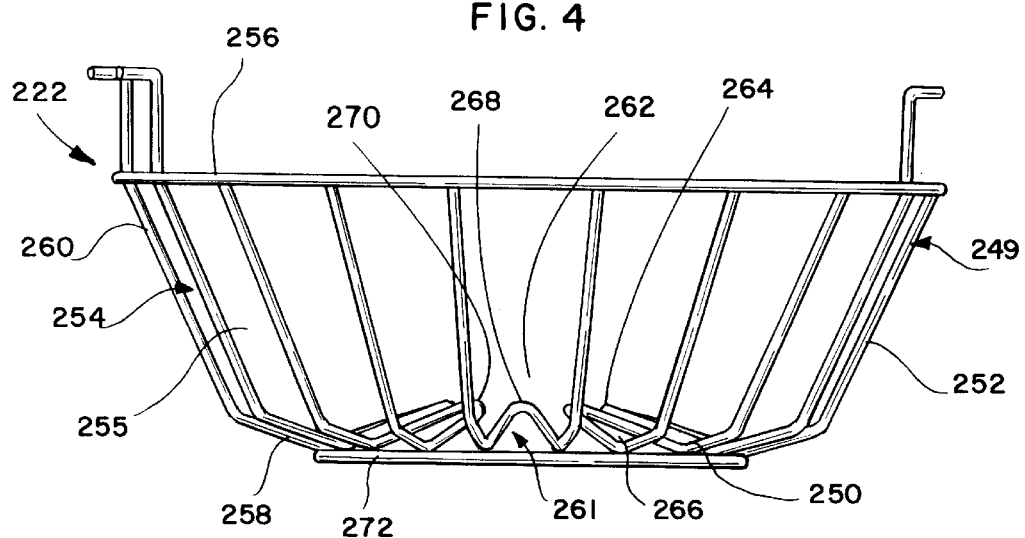
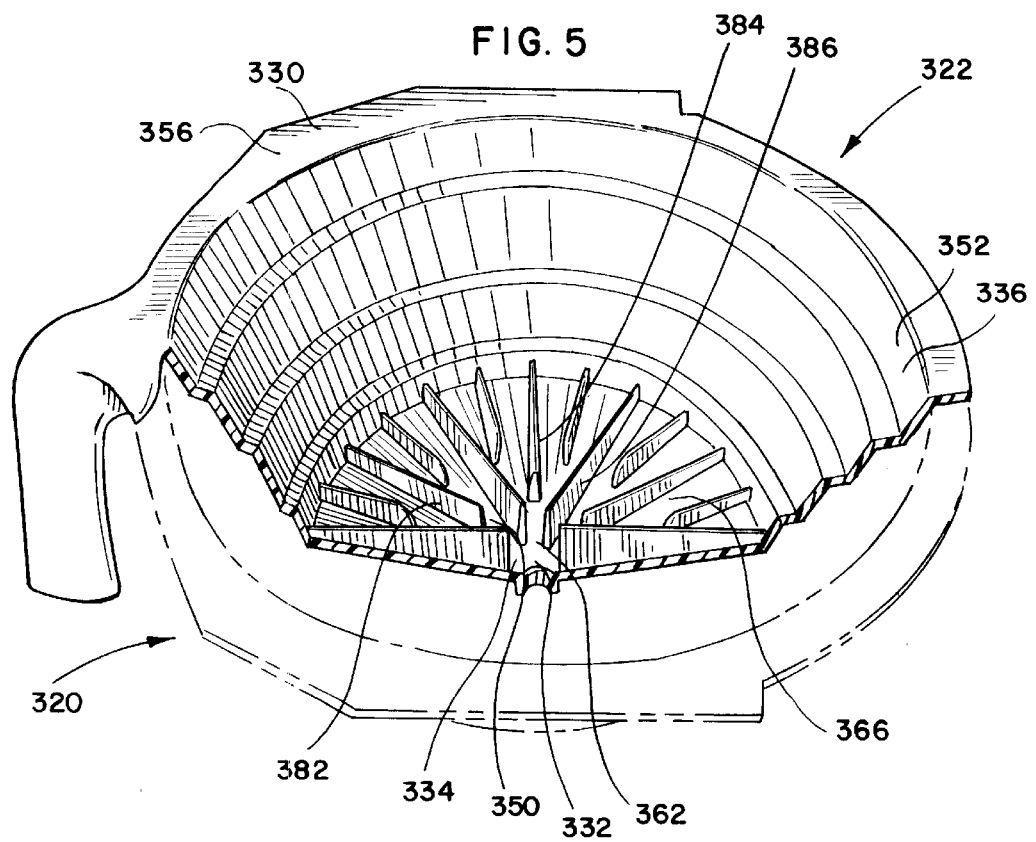

BREWER FILTER SUPPORT

CROSS REFERENCE

This application is a Division of application Ser. No. 09/395,245, filed Sep. 13, 1999, now U.S. Pat. No. 6,250,209 and titled "Brewer Filter Support."

BACKGROUND AND SUMMARY OF THE INVENTION

This invention relates to a beverage brewing filter structure for retaining a brewing substance or a combination of a filter and a brewing substance for infusion with heated water to produce a liquid brewed beverage.

Many beverage brewing filter structures define a frame to support and separate a disposable brewing filter containing a portion of brewing substance disposed therein from internal walls of a beverage brewing funnel. These beverage brewing filter structures must retain the brewing filter and brewing substance so as to space them away from the funnel walls to define a passage therebetween, thereby permitting the liquid brewed beverage to drain from the brewing filter, into the passage and through an aperture formed in the bottom of the funnel. Other beverage brewing filter structures are also formed where the filter structures and the brewing funnels are one in the same.

Typically, filter structures are formed to fit the shape of brewing funnels and to support most mass-produced brewing filters (i.e., disposable paper filters). Such filter structures generally have a base with walls protruding from the base at an obtuse angle, forming an opening with a larger diameter than that of the base. Thus, when the brewing substance is situated within the brewing filter, the brewing filter generally conforms to the shape of the filter structure. This design, however, does not optimize extraction of the brewing substance because when the hot water infuses the brewing substance, the brewing substance directly above the base becomes spent very quickly whereas the brewing substance proximally located along the angled walls is hardly spent at all. Thus, not all of the brewing substance is infused substantially the same amount, potentially leaving an uneven extraction of the brewing substance.

Also, most filter structures have a base that is angled downward so that all the liquid brew flows toward a center point of a brewing filter that is rested in the filter structure. The liquid brew then drains from the brewing filter at this center point into the brewing funnel. This single drainage point design, however, causes the brewing substance near the center point to be thoroughly saturated and perhaps over infused, thus potentially creating additional uneven extraction of the brewing substance and making for a bitter flavor in the brewed liquid.

An object of the present invention is to provide a beverage brewing filter structure with an increased bed depth in order to give a more efficient and consistent extraction of the beverage brewing substance during the infusion process, as well as better taste profile over other standard filter supports.

Another object of the present invention is to provide a beverage brewing filter structure which has a plurality of wicking points through which brew may drip, drain or flow in order to provide a better taste profile over other standard filters supports, as well as a more even extraction of the brewing substance.

Briefly, and in accordance with the foregoing, the first embodiment of the present invention provides a novel beverage brewing filter structure used to retain a brewing filter or, including a reusable filter material attached thereto, and to retain a beverage brewing substance. The structure generally includes a frame having a base, and a wall extending from the base to a top rim, thus defining a generally annular mouth. The wall is made up of a plurality of ribs or other structure defining open spaces. The wall has a first angled portion that extends from the base and a second angled portion that extends from the first angled portion to the top rim. The first angled portion of the ribs defines a smaller angle relative to the base than the second angled portion. The ribs of the wall extend radially inwardly to define a base which is positioned in a plane and has a plurality of gaps therethrough. Each rib conjoins to another rib at a center portion of the base to provide a plurality of wicking points. The ribs of the base are supported by a bottom rim which is generally annular.

The second embodiment of the present invention provides a beverage brewing filter structure similar to that of the first embodiment. The second embodiment differs in that the first angled portion of the ribs defines a larger angle relative to the base than the second portion. In the second embodiment, the ribs also extend radially inwardly to define the base. The base, however, is not positioned in a plane, rather the ribs extend upward toward the mouth.

The third embodiment of the present invention combines a beverage brewing filter structure and a brewing funnel into one structure. The third embodiment differs from the first embodiment in that the walls and the base are continuous as the filter structure also acts as the brewing funnel. The structure also has flanges which act similar to the ribs of the base in that they are positioned in a plane and provide a plurality of gaps therethrough, thereby providing multiple wicking points.

BRIEF DESCRIPTION OF THE DRAWINGS

The features of the present invention which are believed to be novel are set forth with particularity in the appended claims. The organization and manner of the structure and operation of the invention, together with further objects and advantages thereof, may best be understood by reference to the following description taken in connection with the accompanying drawings wherein like reference numerals identify like elements in which:

FIG. 4 is a side elevational view of the second embodiment of the filter structure.

FIG. 5 is a partial fragmentary perspective cross-sectional view of the third embodiment of the filter structure.

DETAILED DESCRIPTION OF THE DRAWINGS

Figure 1:
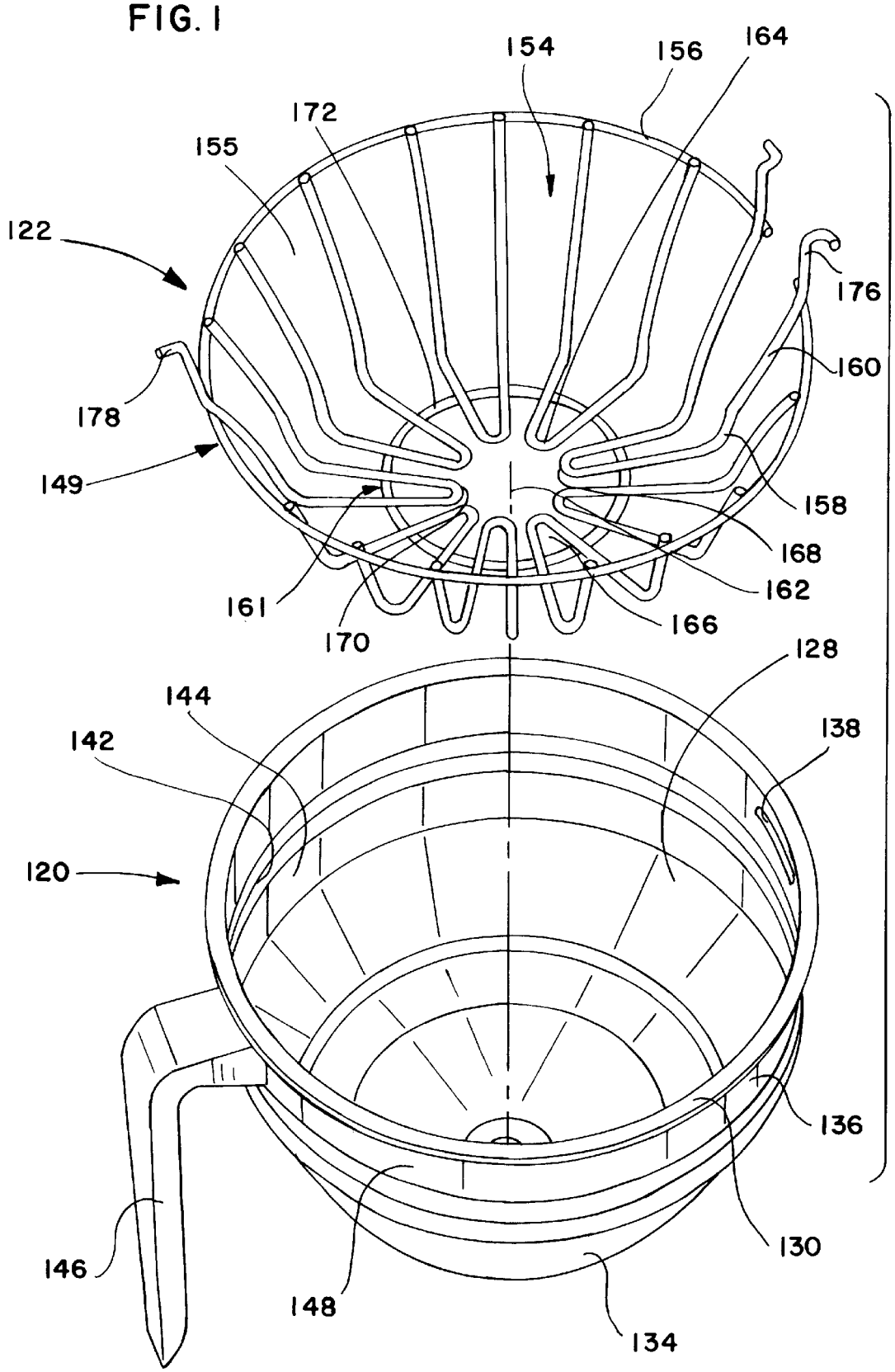
FIG. 1 is an exploded perspective view of a beverage brewing funnel showing a filter structure of the first embodiment nestable inside of the brewing funnel and a handle attachable to the outside of the brewing funnel.

While this invention may be susceptible to embodiment in different forms, there is shown in the drawings and will be described herein in detail, specific embodiments with the understanding that the present disclosures are to be considered exemplifications of the principles of the invention, and are not intended to limit the invention to those as illustrated. Like elements are denoted with like reference numerals with the first embodiment being in the one hundreds, the second embodiment being in the two hundreds, and the third embodiment being in the three hundreds.

Figure 2:
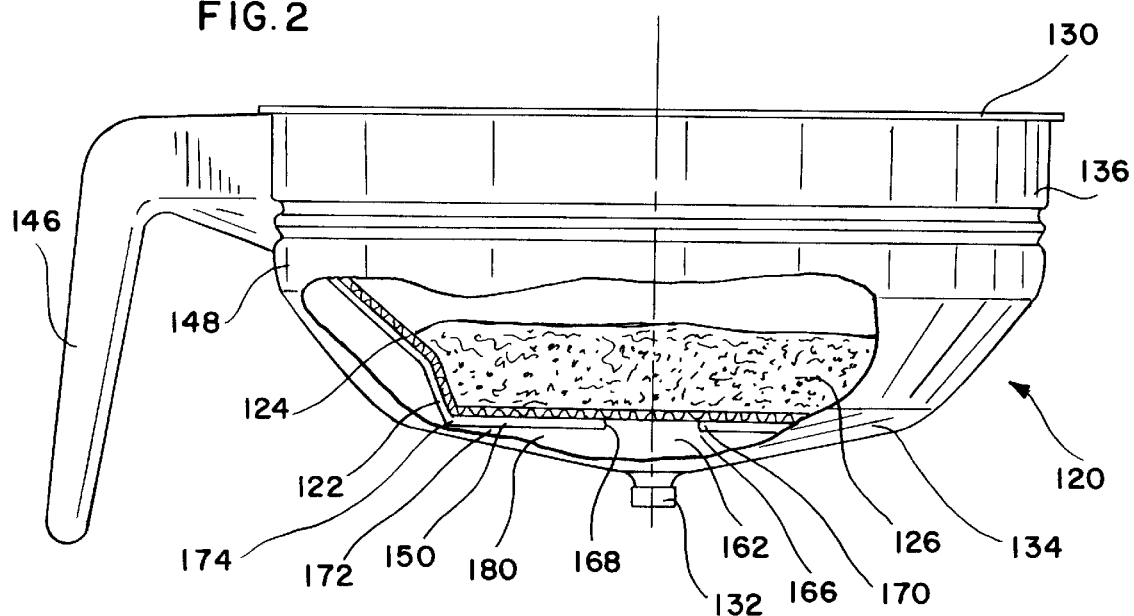
FIG. 2 is a partial fragmentary side view of the beverage brewing funnel in which a portion of a side wall of the funnel and a corresponding portion of the filter structure of the first embodiment and brewing filter disposed inside of the funnel have been removed.

A beverage brewing funnel 120 and a beverage brewing filter structure 122 are shown in an exploded view in FIG. 1 to provide greater detail for reference to the elements thereof. In FIG. 2 the beverage brewing funnel 120 and the beverage brewing filter structure 122 are shown in working fashion along with a brewing filter 124 and a beverage brewing substance 126.

The brewing funnel 120 has a generally frustoconical shape with a top opening 128 which is defined by an annular lip 130, and a drain aperture 132 formed in a bottom surface 134 thereof. A sidewall 136 generally continuously extends around the brewing funnel 120 between the annular lip 130 and the bottom surface 134. A slot 138 and a hole (not shown) are formed through the sidewalls 136 of the brewing funnel 120. An annular groove 142 is formed along an inside surface 144 of the brewing funnel 120. A handle 146 is also provided for on the outside surface 148 of the sidewall 136.

Figure 3:
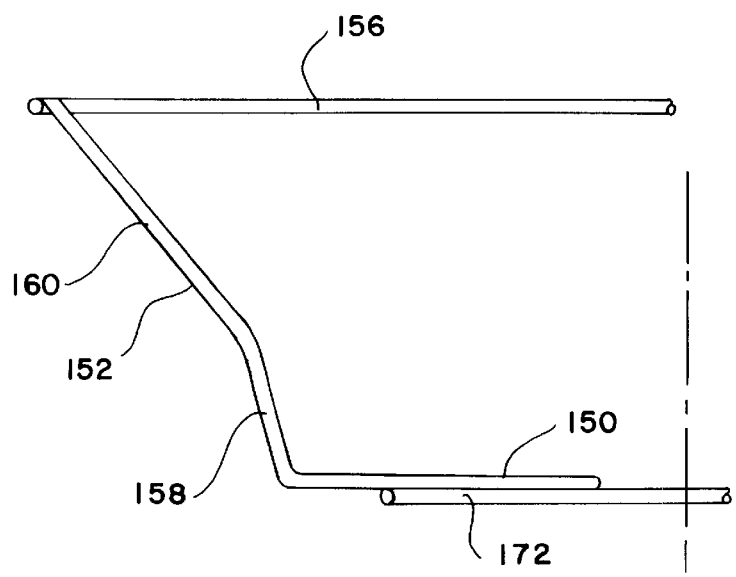
FIG. 3 is a partial cross-sectional view of the first embodiment of the filter structure.

The beverage brewing filter structure 122 includes a frame 149 defining a base 150 and a wall 152 extending from the base 150. The wall 152 is formed from a plurality of ribs 154, or other structures defining open spaces 155, that extend from the base 150 to a generally annular top rim 156. As illustrated in FIG. 3, the ribs 154 are defined by two separate sections, a first angled portion 158 and a second angled portion 160. The first angled portion 158 extends from the base 150 at an obtuse angle relative to the base 150. The second angled portion 160 extends between the first angled portion 158 and the top rim 156 at a greater obtuse angle relative to the base 150 than the first angled portion 158. The first angled portion 158 creates a deep bed depth for the beverage brewing substance 126 to rest in.

The base 150 of the beverage brewing filter structure 122 is formed from a plurality of ribs 161, the ribs 161 being natural extensions of the ribs 154, or other structures defining open spaces 155, that make up the wall 152, as illustrated in FIG. 1. The ribs 161 extend radially inwardly toward a center portion 162 of the base 150. Each rib 161 conjoins with another rib 161 at the center portion 162 of the base 150 forming a wedge or finger 164. The center portion 162 is proximate to the drain aperture 132 that is formed in a bottom surface 134 of the funnel 120. The base 150 defines a plurality of gaps 166. The tip 168 of each finger 164 creates a wicking point 170 at the center portion 162 of the base 150. A generally annular bottom rim 172 provides stability and support for the base 150. Each rib 161 of the base 150 is generally oriented in the same plane 174, except that the ribs 161 may be at a slight angle between the first angled portion 158 and the bottom rim 172.

The brewing filter structure 122 also includes a compressible fork 176 and a prong 178. The compressible fork 176 and the prong 178 are respectively formed by an extension of the ribs 154. The compressible fork 176 and the prong 178 allow for the brewing filter structure 122 to be engaged with the brewing funnel 120 by using the method and apparatus disclosed in U.S. patent application Ser. No. 5,064,533, entitled "Funnel Basket Structure", which is commonly owned by the assignee herein and which disclosure is herein incorporated by reference. As illustrated in FIG. 2, the configuration of the brewing filter structure 122 nestled into the brewing funnel 120 has a chasm 180 between the filter structure 122 and the brewing funnel 120 to allow liquid brew to flow through the brewing filter 124 and along the bottom surface 134 of the brewing funnel 120 toward the drain aperture 132.

In operation, the filter structure 122 is engaged with the funnel 120 as described above. A brewing filter 124 may be placed into the brewing filter structure 122 and a beverage brewing substance 126 is poured into the filter 124. Alternatively, a reusable filter material, such as a metal mesh material, of known construction may be attached to the structure in a known manner. Such reusable filter defining open space therein. Depending upon the amount of brewing substance 126 desired to be used, the beverage brewing substance 126 is wholly or primarily retained between the first angled portions 158 of the ribs 154 of the walls 152, above the base 150.

The beverage brewing funnel 120 is then placed into a beverage brewing machine (not shown). The annular lip 130 allows for the brewing funnel 120 to be removably placed and supported within the brewing machine. When the brewing funnel 120 is placed within a beverage brewing machine and the machine is turned on, a spray of hot water enters the brewing funnel 120 through the top opening 128. The hot water then infuses with the beverage brewing substance 126, extracting various characteristics from the brewing substance 126 to form a liquid brew. The first and second angled portions 158, 160 of the ribs 154 allow for a more even extraction from the brewing substance 126, by allowing the infusion of the hot water with the brewing substance 126 to occur for a longer time period through more portions of the brewing substance 126. Other versions of filter supports do not allow for as even an extraction of the brewing substance because, first, the hot water does not infuse with as much of the brewing substance because the bed depth is more shallow, and second, because bed depth is more shallow, the infusion process does not take as long. The more brewing substance that is infused either by an increase in bed depth or by an increase in infusion time, the more even the extraction will be. The more even the extraction of the brewing substance, the better the taste profile will be.

The liquid brew will then gravitate toward the center portion 162 of the base 150 of the brewing filter structure 122. In significant portion, the liquid brew will begin to drain through the brewing filter 124 at the many different wicking points 170 created by the brewing filter structure 122. A multitude of wicking points 170 allow for the more even extraction of solid brewing substance 126 into liquid brewing substance 126, thereby improving the flavor of the liquid brew. The liquid brew then drains out of the brewing funnel 120 through the drain aperture 132 into a liquid brew receptacle (not shown). Other versions of filter structures have bases that angle toward the center of the structure, causing the liquid brew to wick from a single center portion. This can result in an uneven extraction as all of the hot water necessarily must go through the brewing substance toward the center of the structure. In this regard, the substance spaced away from the center of the filter structure will be infused for a shorter period of time than the brewing substance in the center of the structure. Thus, the brewing substance in the center of the structure will most likely be thoroughly saturated and perhaps over infused, thus decreasing the flavor of the liquid brew.

Invariably, some of the liquid brew will not drain through the brewing filter 124 at the wicking points 170, but will rather drain through the brewing filter 124 and through the gaps 166 provided in the base 150 of the brewing filter structure 122. The chasm 180 provided for between the base 150 of the filter structure 122 and the bottom surface 134 of the brewing funnel 120 allows for the liquid brew that has drained through the gaps 166 of the base 150 other than at the wicking points 170 to drain through the filter 124 and flow through the chasm 180 toward the drain aperture 132, further preventing the saturation and over infusion of the brewing substance 126 situated at the center portion 162 of the base 150.

The second embodiment of the present invention, as illustrated in FIG. 4, promotes the same operation and purpose as does the first embodiment, although the structure is different. The second embodiment will be described as though it were positioned within the brewing funnel 120 of the first embodiment. The second embodiment includes a frame 249 defining a base 250 and a wall 252 extending from the base 250. The wall 252 is formed from a plurality of ribs 254, or other structures defining open spaces 255, that extend from the base 250 to a generally annular top rim 256. The ribs 254 are defined by two separate sections, a first angled portion 258 and a second angled portion 260. The first angled portion 258 extends from the base 250 at an obtuse angle relative to the base 250. The second angled portion 260 extends between the first angled portion 258 and the top rim 256 at a smaller obtuse angle relative to the base 250 than the first angled portion 258. The first angled portion 258 and the second angled portion 260 create a deep bed depth.

The base 250 of the beverage brewing filter structure 222 is formed from a plurality of ribs 261, the ribs 261 being natural extensions of the ribs 254, or other structures defining open spaces 255, that make up the wall 252, as illustrated in FIG. 4. The ribs 261 extend radially inwardly toward a center portion 262 of the base 250. Each rib 261 conjoins with another rib 261 at the center portion 262 of the base 250 forming a wedge or finger 264. The center portion 262 is proximate to the drain aperture 132 that is formed in a bottom surface 134 of the funnel 120. The base 250 defines a plurality of gaps 266. The tip 268 of each finger 264 creates a wicking point 270 at the center portion 262 of the base 250. A generally annular bottom rim 272 provides stability and support for the base 250. Each rib 261 of the base 250 is generally oriented at an angle so that the ribs 261 extend upward toward the top rim 256 of the brewing filter structure 222.

The third embodiment, as illustrated in FIG. 5, also promotes the same operation and purpose as does the first embodiment, although again, the structure is different. The third embodiment combines the brewing filter structure 322 with the funnel 320 into one structure.

In the filter structure 322, the wall 352 also operates as a sidewall 336 of the brewing funnel 320. The wall 352 is generally continuous, without open spaces. The wall 352 extends from a top rim 356, which also operates as an annular lip 330 of the funnel 320, to the base 350. The base 350 of the brewing filter structure 322 is formed from a plurality of flanges 382. The flanges 382 extend radially inwardly toward a center portion 362 of the base 350. The center portion 362 is proximate to the drain aperture 332 that is formed in a bottom surface 334 of the funnel 320. The base 350 defines a plurality of gaps 366. The tip 384 of each flange 382 creates a wicking point 370 at the center portion 362 of the base 350. The bottom surface 334 of the brewing funnel 320 provides stability and support for the base 350. The tops 384 of the flanges 382 are generally oriented in the same plane, but the bottoms 386 of the flanges 382 are not. The bottoms 386 of the flanges 382 rest on the bottom surface 334 of the brewing funnel 320 and thus follow the same angle that the bottom surface 334 has from the wall 352, or sidewall 336, to the drain aperture 332. Thus, the flanges 382 are taller proximate to the drain aperture 332 than when proximate to the wall 352 or sidewall 336.

What is claimed is:

1. A beverage brewing filter structure for retaining a quantity of beverage brewing substance comprising:
    a base, a wall extending upwardly from said base defining a mouth, a plurality of flanges extending from said base, each of said flanges having a top portion; each of said flanges extends from said wall towards a center portion of said base, said top portions of said plurality of flanges being generally oriented in an upwardly direction from said wall toward said mouth, each of said flanges having at least one wicking point, said beverage brewing filter structure being integrally formed.

2. A beverage brewing filter structure as defined in claim 1, wherein said wall is continuous.

3. A beverage brewing filter structure as defined in claim 1, wherein said wall comprises a plurality of opposable side walls.

4. A beverage brewing filter structure as defined in claim 1, wherein said plurality of flanges generally extend radially from said wall towards said center portion of said base.

5. A beverage brewing filter structure as defined in claim 1, wherein said plurality of flanges have a length shorter than said distance between said wall and said center portion of said base.

6. A beverage brewing filter structure as defined in claim 1, wherein said plurality of flanges have a length equal to said distance between said wall and said center portion of said base.

7. A beverage brewing filter structure as defined in claim 1, wherein said plurality of flanges consist of said flanges having a length shorter than said distance between said wall and said center portion of said base and said flanges having a length equal to said distance between said wall and said center portion of said base.

* * * * *